US008564704B2

(12) United States Patent
Taka et al.

(10) Patent No.: US 8,564,704 B2
(45) Date of Patent: Oct. 22, 2013

(54) SOLID-STATE IMAGING DEVICE HAVING TRANSIMPEDANCE AMPLIFIER

(75) Inventors: Tetsuya Taka, Hamamatsu (JP);
Seiichiro Mizuno, Hamamatsu (JP);
Haruhiro Funakoshi, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 333 days.

(21) Appl. No.: 12/518,383

(22) PCT Filed: Dec. 11, 2007

(86) PCT No.: PCT/JP2007/073871
§ 371 (c)(1),
(2), (4) Date: Jul. 9, 2009

(87) PCT Pub. No.: WO2008/072632
PCT Pub. Date: Jun. 19, 2008

(65) Prior Publication Data
US 2010/0295979 A1    Nov. 25, 2010

(30) Foreign Application Priority Data

Dec. 13, 2006 (JP) ................. P2006-336036

(51) Int. Cl.
H04N 3/14 (2006.01)
H04N 5/335 (2011.01)
H03M 9/00 (2006.01)

(52) U.S. Cl.
USPC ............................ 348/300; 348/308; 341/100

(58) Field of Classification Search
USPC ................... 348/300, 303, 304, 308; 341/100
See application file for complete search history.

(56) References Cited

U.S. PATENT DOCUMENTS 5,281,860 A    1/1994  Krenik et al.
5,822,104 A *  10/1998 Saito ............................ 398/202

(Continued)

FOREIGN PATENT DOCUMENTS

JP      63-204131       8/1988
JP       7-239994       9/1995

(Continued)

OTHER PUBLICATIONS

"Study on Imitation and Design of CMOS Compatible Photoelectric Detector and Receiver," Chinese Doctoral Dissertations & Master's Theses Full-text Database (Master), Information Science and Technology, Dec. 15, 2004, with English-language abstract attached.

(Continued)

*Primary Examiner* — Joel Fosselman
(74) *Attorney, Agent, or Firm* — Drinker Biddle & Reath LLP

(57) ABSTRACT

A solid-state imaging device 1 includes photodiodes $PD_1$ to $PD_N$, charge-voltage converting circuits $10_1$ to $10_N$, pre-holding circuits $20_1$ to $20_N$, a transimpedance amplifier 30, a peak holding circuit 50, and a post-holding circuit 60. The charge-voltage converting circuit $10_n$ inputs charges generated at the photodiode $PD_n$ and outputs a voltage value corresponding to the input charge quantity. The pre-holding circuit $20_n$ holds the output voltage value from the charge-voltage converting circuit $10_n$ and outputs the output voltage value as a current. The transimpedance amplifier 30 inputs voltage values successively output form the pre-holding circuits $20_1$ to $20_N$ as currents and outputs voltage values converted based on a transimpedance from the currents flowing in accordance with change quantities to the input voltage values from a reference voltage value. The peak holding circuit 50 holds and outputs a peak hold voltage of the output voltage values from the transimpedance amplifier 30.

3 Claims, 7 Drawing Sheets

(56) References Cited

U.S. PATENT DOCUMENTS

| | | | |
|---|---|---|---|
| 6,222,175 | B1 | 4/2001 | Krymski |
| 6,885,396 | B1 | 4/2005 | Panicacci et al. |
| 6,975,356 | B1 | 12/2005 | Miyamoto |
| 2002/0012058 | A1* | 1/2002 | Mizuno .................. 348/308 |

FOREIGN PATENT DOCUMENTS

| | | |
|---|---|---|
| JP | 8-201443 | 8/1996 |
| JP | H10-336526 | 12/1998 |
| JP | 2002-199292 | 7/2002 |
| JP | 2004-120316 | 4/2004 |
| JP | 2005-114667 | 4/2005 |
| WO | 00/14960 | 3/2000 |
| WO | WO 00/46981 | 8/2000 |

OTHER PUBLICATIONS

"A Primer on Photodiode Technology," Dec. 11, 2004, XP55038653, Retrieved from the Internet: URL: http://web.archive.org/web/20041211180434/http://home.sandiego.edu/~ekim/photodiode/pdtech.html [retrieved on Sep. 19, 2012].

* cited by examiner

SOLID-STATE IMAGING DEVICE HAVING TRANSIMPEDANCE AMPLIFIER

TECHNICAL FIELD

The present invention relates to a solid-state imaging device including photodiodes which generate charge quantities corresponding to incident light amounts.

BACKGROUND ART

As a solid-state imaging device on the basis of the CMOS technique, there is known one comprising photodiodes, charge-voltage converting circuits, holding circuits, and a readout circuit (refer to Patent Document 1). In this solid-state imaging device, charge quantities corresponding to incident light amounts on the photodiodes are generated at the photodiodes, and voltage values corresponding to charge quantities are output from the charge-voltage converting circuits, and the voltage values output from the charge-voltage converting circuits are held by the holding circuits. One readout circuit is provided for a plurality of sets, each of which consists of a photodiode, a charge-voltage converting circuit, and a holding circuit, and voltage values successively output from the holding circuits of the respective sets are read out through the readout circuit.

Generally, the readout circuit includes an amplifier, a capacitor, and a switch. The capacitor and the switch are connected in parallel to each other, and connected between the input terminal and the output terminal of the amplifier. In the readout circuit, when reading out voltage values successively output from the holding circuits of the respective sets, the capacitor is discharged by closing of the switch only for a given period, and during the subsequent period of opening of the switch, charge quantity corresponding to the voltage value output from the holding circuit of a certain set is accumulated in the capacitor, and a voltage value corresponding to the accumulated charge quantity is output. This operation of the readout circuit is performed for each time of reading out of the voltage values successively output from the holding circuits of the respective sets.

Patent Document 1: Japanese Published Unexamined Patent Application No. H07-239994

DISCLOSURE OF THE INVENTION

Problem to be Solved by the Invention

The above-described solid-state imaging device can read out voltage values successively output from the holding circuits of the respective sets with high accuracy by the readout circuit, however, there is a limit to high-speed readout. In other words, in the readout circuit, each time of reading out of voltage values successively output from the holding circuits of the respective sets, the switch must be closed only for a given period. A large-capacity capacitor is connected to the input terminal of the readout circuit, so that it takes time until the output voltage value of the readout circuit becomes steady after an input of the voltage value output from the holding circuit into the readout circuit. From these facts, there is a limit to high-speed readout of the voltage values successively output from the holding circuits of the respective sets by the readout circuit.

The present invention was made to solve the above-described problem, and an object thereof is to provide a solid-state imaging device which can read out a voltage value corresponding to an incident light amount on the photodiode with high accuracy as well as high speed.

Means for Solving the Problem

A first solid-state imaging device includes: (1) photodiodes which generate charge quantities corresponding to incident light amounts; (2) charge-voltage converting circuits which input charges generated at the photodiodes and output voltage values corresponding to the input charge quantities; (3) pre-holding circuits which input and hold voltage values output from the charge-voltage converting circuits and output the held voltage values as currents; (4) a transimpedance amplifier which inputs voltage values held and output by the pre-holding circuits as currents, and outputs voltage values converted based on a transimpedance from the currents flowing in accordance with change quantities to the input voltage values from a reference voltage value; and (5) a peak holding circuit which inputs voltage values output from the transimpedance amplifier, holds a peak voltage value of the input voltage values, and outputs a voltage value corresponding to the held peak voltage value.

In this first solid-state imaging device, voltage values corresponding to the charge quantities generated at the photodiodes are output from the charge-voltage converting circuits. The voltage values output from the charge-voltage converting circuits are held by the pre-holding circuits, and the held voltage values are output from the pre-holding circuits. The voltage values held and output by the pre-holding circuits are input as currents into the transimpedance amplifier, and voltage values converted based on a transimpedance from the currents flowing in accordance with change quantities to the input voltage values from the reference voltage value are output from the transimpedance amplifier. Then, the voltage values output from the transimpedance amplifier are input into the peak holding circuit, and a peak voltage value of the input voltage values is held by the peak holding circuit, and a voltage value corresponding to the held peak voltage value is output.

A second solid-state imaging device includes: (1) photodiodes which generate charge quantities corresponding to incident light amounts; (2) charge-voltage converting circuits which input charges generated at the photodiodes and output voltage values corresponding to the input charge quantities; (3) first pre-holding circuits which input and hold voltage values output at a first clock time from the charge-voltage converting circuits, and output the held voltage values as currents; (4) second pre-holding circuits which input and hold the voltage values output at a second clock time different from the first clock time from the charge-voltage converting circuits, and output the held voltage values as currents simultaneously with the first pre-holding circuits; (5) a first transimpedance amplifier which inputs voltage values held and output by the first pre-holding circuits as currents, and output voltage values converted based on a transimpedance from the currents flowing in accordance with change quantities to the input voltage values from a reference voltage value; (6) a second transimpedance amplifier which inputs voltage values held and output by the second pre-holding circuits as currents, and outputs voltage values converted based on a transimpedance from the currents flowing in accordance with change quantities to the input voltage values from the reference voltage value; (7) a subtracting circuit which inputs voltage values output from the first transimpedance amplifier and the second transimpedance amplifier respectively, and outputs voltage values corresponding to the differences between these two input voltage values; and (8) a peak holding circuit which inputs voltage values output from the subtracting circuit, holds a peak voltage value of the input voltage values, and outputs a voltage value corresponding to the held peak voltage value.

In this second solid-state imaging device, voltage values corresponding to charge quantities generated at the photodiodes are output from the charge-voltage converting circuits. Voltage values (for example, signal component+dark component) output from the charge-voltage converting circuits at a first clock time are held by the first pre-holding circuits, and the held voltage values are output as currents from the first pre-holding circuits. Voltage values (for example, dark component) output from the charge-voltage converting circuits at a second clock time different from the first clock time are held by the second pre-holding circuits, and the held voltage values are output as currents from the second pre-holding circuits simultaneously with the first pre-holding circuits. The voltage values held and output by the first pre-holding circuits are input as currents into the first transimpedance amplifier, and voltage values converted based on a transimpedance from the currents flowing in accordance with change quantities to the input voltage values from a reference voltage value are output from the first transimpedance amplifier. The voltage values held and output by the second pre-holding circuit are input as currents into the second transimpedance amplifier, and voltage values converted based on a transimpedance from the currents flowing in accordance with change quantities to the input voltage values from the reference voltage value are output from the second transimpedance amplifier. The voltage values output from the first transimpedance amplifier and the second transimpedance amplifier respectively, are input into the subtracting circuit, and voltage values corresponding to the differences between these two input voltage values are output from the subtracting circuit. Then, the voltage values output from the subtracting circuit are input into the peak holding circuit, and a peak voltage value of the input voltage values is held by the peak holding circuit, and a voltage value corresponding to the held peak voltage value is output.

Preferably, the first or second solid-state imaging device further includes a post-holding circuit which inputs and holds the voltage value output from the peak holding circuit, and outputs the held voltage value. In this case, the voltage value output from the peak holding circuit is held by the post-holding circuit, and the held voltage value is output from the post-holding circuit.

As described above, the first solid-state imaging device includes: photodiodes; charge-voltage converting circuits provided after the photodiodes; first pre-holding circuits provided after the charge-voltage converting circuits; a first transimpedance amplifier which is provided after the first pre-holding circuits and has a capacitor between input and output terminals thereof; and a peak holding circuit provided after the first transimpedance amplifier.

The second solid-state imaging device includes: in addition to the configuration of the first solid-state imaging device, second pre-holding circuits provided in parallel to the first pre-holding circuits after the charge-voltage converting circuits; a second transimpedance amplifier which is provided after the second pre-holding circuits and has a capacitor between input and output terminals thereof; and a subtracting circuit which is interposed between the output terminal of the first transimpedance amplifier and the output terminal of the second transimpedance amplifier, and the peak holding circuit.

Effect of the Invention

According to the present invention, a voltage value corresponding to an incident light amount on the photodiode can be read out with high accuracy as well as high speed.

Figure 1:
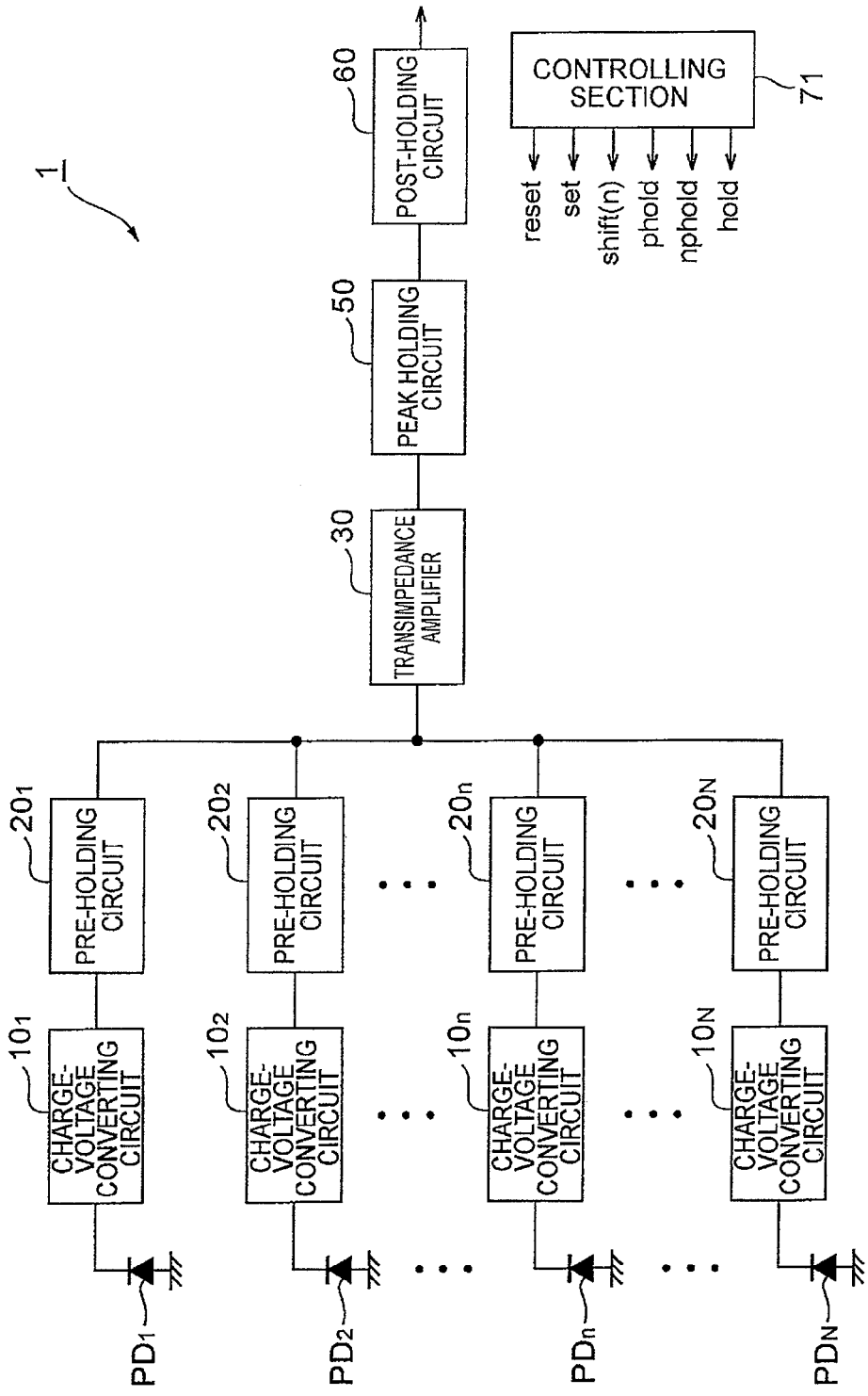
FIG. 1 is an entire configuration view of a solid-state imaging device 1 of a first embodiment.

DESCRIPTION OF SYMBOLS 1, 2: solid-state imaging device
10: charge-voltage converting circuit
20-22: pre-holding circuit
30-32: transimpedance amplifier
40: subtracting circuit
50: peak holding circuit
60: post-holding circuit
71, 72: controlling section
A: amplifier
C: capacitor
R: resistor
SW: switch
PD: photodiode

BEST MODES FOR CARRYING OUT THE INVENTION

Hereinafter, best modes for carrying out the present invention will be described in detail with reference to the accompanying drawings. In the description of the drawings, elements identical to each other will be referred to with identical reference numerals and letters and overlapping description will be omitted.

First Embodiment

First, a first embodiment of a solid-state imaging device of the present invention will be described. FIG. 1 is an entire configuration view of a solid-state imaging device 1 of a first embodiment. The solid-state imaging device 1 shown in this figure includes N photodiodes $PD_1$ to $PD_N$, N charge-voltage converting circuits $10_1$ to $10_N$, N pre-holding circuits $20_1$ to $20_N$, a transimpedance amplifier 30, a peak holding circuit 50, a post-holding circuit 60, and a controlling section 71. Here, N is an integer not less than 2, and n appearing hereinafter is an integer not less than 1 and not more than N.

The N photodiodes $PD_1$ to $PD_N$ have a common configuration, and are one-dimensionally arrayed. Anode terminals of the photodiodes $PD_n$ are grounded. Each photodiode $PD_n$ generates a charge quantity corresponding to an incident light amount.

The N charge-voltage converting circuits $10_1$ to $10_N$ have a common configuration. Input terminals of the charge-voltage converting circuits $10_n$ are connected to the cathode terminals of the photodiodes $PD_n$. The charge-voltage converting circuits $10_n$ input charges generated at the photodiodes $PD_n$ into the input terminals, and output voltage values corresponding to the input charge quantities from the output terminals to the pre-holding circuits $20_n$.

The N pre-holding circuits $20_1$ to $20_N$ have a common configuration. The input terminals of the pre-holding circuits $20_n$ are connected to output terminals of the charge-voltage converting circuits $10_n$. The pre-holding circuits $20_n$ input voltage values output from the charge-voltage converting circuits $10_n$ into the input terminals and hold these, and output the held voltage values as currents from the output terminals to the transimpedance amplifier 30.

The input terminal of the transimpedance amplifier 30 is connected to the respective output terminals of the N pre-holding circuits $20_1$ to $20_N$. The transimpedance amplifier 30 inputs voltage values held and successively output by the N pre-holding circuits $20_1$ to $20_N$ respectively, as currents into the input terminals, and outputs voltage values converted based on a transimpedance from the currents flowing in accordance with change quantities to the input voltage values from a reference voltage value into the peak holding circuit 50 from the output terminals.

The input terminal of the peak holding circuit 50 is connected to the output terminal of the transimpedance amplifier 30. The peak holding circuit 50 inputs voltage values output from the transimpedance amplifier 30 into the input terminal, and holds a peak voltage value of the input voltage values, and outputs a voltage value corresponding to the held peak voltage value from the output terminal to the post-holding circuit 60.

The input terminal of the post-holding circuit 60 is connected to the output terminal of the peak holding circuit 50. The post-holding circuit 60 inputs the voltage value output from the peak holding circuit 50 into the input terminal and holds it, and outputs the held voltage value from the output terminal to the outside.

The controlling section 71 controls operations of the entirety of the solid-state imaging device 1. In particular, the controlling section 71 controls respective operations of the N charge-voltage converting circuits $10_1$ to $10_N$, the N pre-holding circuits $20_1$ to $20_N$, the peak holding circuit 50, and the post-holding circuit 60.

This solid-state imaging device 1 operates as follows under control by the controlling section 71. In the N photodiodes $PD_1$ to $PD_N$, respectively, one-dimensionally arrayed charge quantities corresponding to incident light amounts are generated. The charges generated at each photodiode $PD_n$ are input into the charge-voltage converting circuit $10_n$, and a voltage value corresponding to the input charge quantity is output from the charge-voltage converting circuit $10_n$ to the pre-holding circuit $20_n$.

The voltage value output from each charge-voltage converting circuit $10_n$ is held by the pre-holding circuit $20_n$, and the held voltage value is output as a current from the pre-holding circuit $20_n$ to the transimpedance amplifier 30. At this time, the voltage values held by the N pre-holding circuits $20_1$ to $20_N$ respectively, are successively output as currents to the transimpedance amplifier 30.

The voltage values output from the pre-holding circuits $20_n$ are successively input as currents into the transimpedance amplifier 30, and voltage values converted based on a transimpedance from the currents flowing in accordance with change quantities to the input voltage values from a reference voltage value are output from the transimpedance amplifier 30 to the peak holding circuit 50. The voltage values output from the transimpedance amplifier 30 are input into the peak holding circuit 50, and a peak voltage value of the input voltage values is held by the peak holding circuit 50, and a voltage value corresponding to the held peak voltage value is output from the peak holding circuit 50 to the post-holding circuit 60. The voltage value output from the peak holding circuit 50 is held by the post-holding circuit 60, and the held voltage value is output from the post-holding circuit 60 to the outside.

Figure 2:
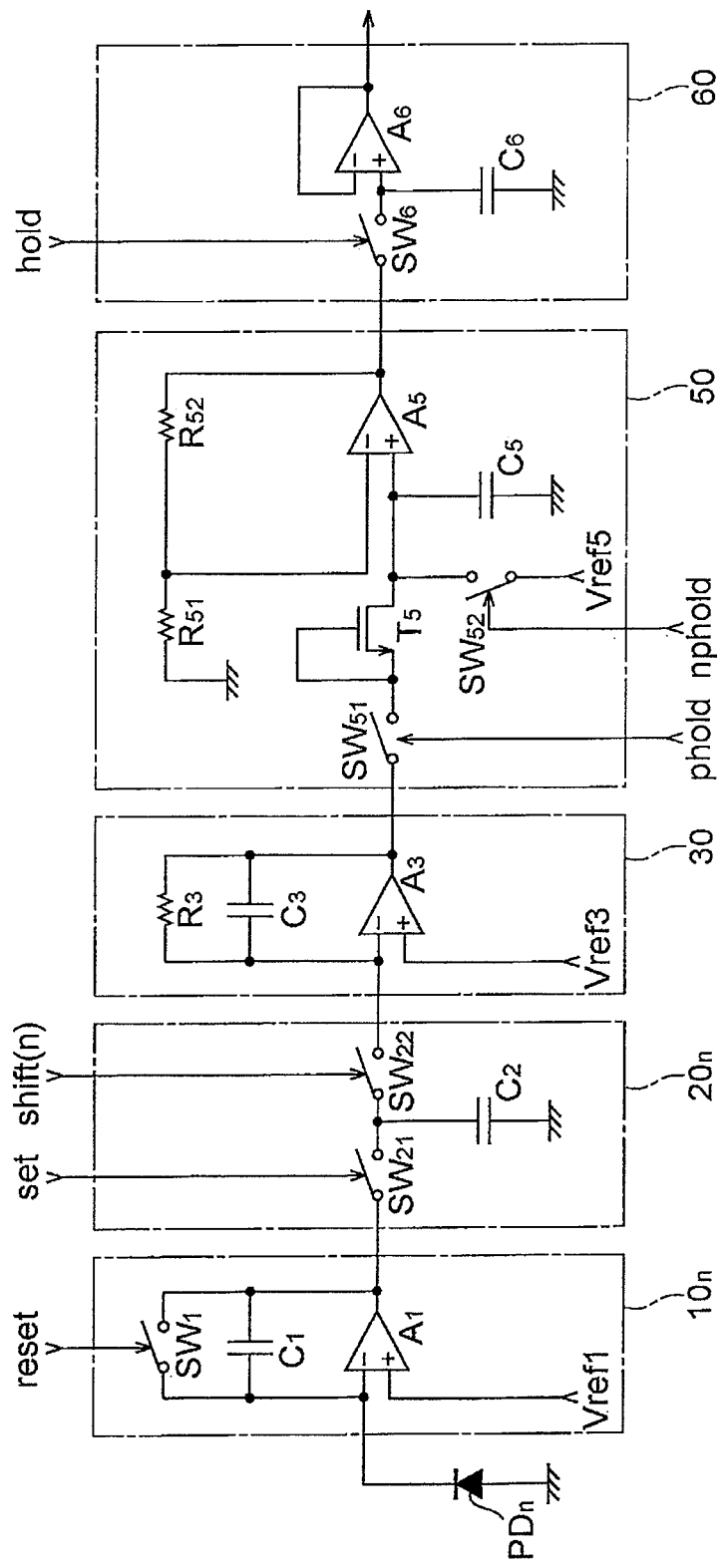
FIG. 2 is a circuit diagram of the solid-state imaging device 1 of the first embodiment.

FIG. 2 is a circuit diagram of the solid-state imaging device 1 of the first embodiment. In this figure, the n-th photodiode $PD_n$ is shown as a representative of the N photodiodes $PD_1$ to $PD_N$, the n-th charge-voltage converting circuit $10_n$ is shown as a representative of the N charge-voltage converting circuits $10_1$ to $10_N$, and the n-th pre-holding circuit $20_n$ is shown as a representative of the N pre-holding circuits $20_1$ to $20_N$.

Each charge-voltage converting circuit $10_n$ includes an amplifier $A_1$, a capacitor $C_1$, and a switch $SW_1$. Into the non-inverting input terminal of the amplifier $A_1$, a reference voltage value Vref1 is input. The inverting input terminal of the amplifier $A_1$ serves as the input terminal of the charge-voltage converting circuit $10_n$, and is connected to the cathode terminal of the photodiode $PD_n$. The output terminal of the amplifier $A_1$ serves as the output terminal of the charge-voltage converting circuit $10_n$. The capacitor $C_1$ and the switch $SW_1$ are connected in parallel to each other, and are connected between the inverting input terminal and the output terminal of the amplifier $A_1$. The switch $SW_1$ opens and closes in accordance with the level of a reset signal output from the controlling section 71. This reset signal is supplied commonly to the respective switches $SW_1$ of the N charge-voltage converting circuits $10_1$ to $10_N$. When the switch $SW_1$ closes, the capacitor $C_1$ is discharged, and the voltage value to be output from the charge-voltage converting circuit $10_n$ to the pre-holding circuit $20_n$ is initialized. When the switch $SW_1$ opens, the charges input into the charge-voltage converting circuit $10_n$ from the photodiode $PD_n$ are accumulated in the capacitor $C_1$, and a voltage value corresponding to the accumulated charge quantity is output from the charge-voltage converting circuit $10_n$ to the pre-holding circuit $20_n$.

Each pre-holding circuit $20_n$ includes a capacitor $C_2$, a switch $SW_{21}$, and a switch $SW_{22}$. The switch $SW_{21}$ and the switch $SW_{22}$ are provided in series mutually between the input terminal and the output terminal of the pre-holding circuit $20_n$. One end of the capacitor $C_2$ is connected to a connecting point between the switch $SW_{21}$ and the switch $SW_{22}$, and the other end of the capacitor $C_2$ is grounded. The switch $SW_{21}$ opens and closes in accordance with the level of a set signal output from the controlling section 71. This set signal is supplied commonly to the respective switches $SW_{21}$ of the N pre-holding circuits $20_1$ to $20_N$. The switch $SW_{22}$ opens and closes in accordance with the level of a shift(n) signal output from the controlling section 71. This shift(n) signal is supplied individually to the switch $SW_{22}$ of the n-th pre-holding circuit $20_n$. When the switch $SW_{21}$ switches from a closed state to an opened state, the voltage value input into the pre-holding circuit $20_n$ from the charge-voltage converting circuit $10_n$ immediately before this switching is held by the capacitor $C_2$ from then on. When the switch $SW_{22}$ closes, the voltage value held by the capacitor $C_2$ is output as a current from the pre-holding circuit $20_n$ to the transimpedance amplifier 30.

The transimpedance amplifier 30 includes an amplifier $A_3$, a capacitor $C_3$, and a resistor $R_3$. Into the non-inverting input terminal of the amplifier $A_3$, a reference voltage value Vref3 is input. The inverting input terminal of the amplifier $A_3$ serves as the input terminal of the transimpedance amplifier 30, and is connected to the switches of the pre-holding circuits $20_n$. The output terminal of the amplifier $A_3$ serves as the output terminal of the transimpedance amplifier 30. The capacitor $C_3$ and the resistor $R_3$ are connected in parallel to each other, and are connected between the inverting input terminal and the output terminal of the amplifier $A_3$. In the transimpedance amplifier 30 thus configured, voltage values converted based on a transimpedance from currents flowing in accordance with change quantities of the voltage values output from the pre-holding circuits $20_n$ are output from the transimpedance amplifier 30 to the peak holding circuit 50.

The peak holding circuit 50 includes an amplifier $A_5$, a switch $SW_{51}$, a switch $SW_{52}$, a resistor $R_{51}$, a capacitor $C_5$, a resistor $R_{52}$, and a FET transistor $T_5$. One end of the switch $SW_{51}$ serves as the input terminal of the peak holding circuit 50, and is connected to the output terminal of the amplifier $A_3$ of the transimpedance amplifier 30. The other end of the switch $SW_{51}$ is connected to the source terminal of the FET transistor $T_5$. The source terminal and the gate terminal of the FET transistor $T_5$ are connected to each other, and the FET transistor $T_5$ operates as a diode. The non-inverting input terminal of the amplifier $A_5$ is connected to the drain terminal of the FET transistor $T_5$, and a reference voltage value Vref5 is input therein via the switch $SW_{52}$. One end of the capacitor $C_5$ is connected to the non-inverting input terminal of the amplifier $A_5$, and the other end of the capacitor $C_5$ is grounded. The inverting input terminal of the amplifier $A_5$ is grounded via the resistor $R_{51}$. The output terminal of the amplifier $A_5$ serves as the output terminal of the peak holding circuit 50. The resistor $R_{52}$ is connected between the inverting input terminal and the output terminal of the amplifier $A_5$. The switch $SW_{51}$ opens and closes in accordance with the level of a phold signal output from the controlling section 71. The switch $SW_{52}$ opens and closes in accordance with the level of an nphold signal output from the controlling section 71. When the switch $SW_{52}$ closes, the capacitor $C_5$ is reset, and the voltage value to be output from the peak holding circuit 50 to the post-holding circuit 60 is initialized. In a state where the switch $SW_{52}$ is open, when the switch $SW_{51}$ closes, a peak voltage value of the voltage values input thereafter into the peak holding circuit 50 from the transimpedance amplifier 30 is held by the capacitor $C_5$, and a voltage value corresponding to the held peak voltage value is output from the peak holding circuit 50 to the post-holding circuit 60.

The post-holding circuit 60 includes an amplifier $A_6$, a capacitor $C_6$, and a switch $SW_6$. One end of the switch $SW_6$ serves as the input terminal of the post-holding circuit 60, and is connected to the output terminal of the amplifier $A_5$ of the peak holding circuit 50. The non-inverting input terminal of the amplifier $A_6$ is connected to the other end of the switch $SW_6$. One end of the capacitor $C_6$ is connected to the non-inverting input terminal of the amplifier $A_6$, and the other end of the capacitor $C_6$ is grounded. The inverting input terminal of the amplifier $A_6$ is directly connected to the output terminal of the amplifier $A_6$. The output terminal of the amplifier $A_6$ serves as the output terminal of the post-holding circuit 60. The switch $SW_6$ opens and closes in accordance with the level of a hold signal output from the controlling section 71. When the switch $SW_6$ switches from a closed state to an opened state, a voltage value which was input from the peak holding circuit 50 into the post-holding circuit 60 immediately before this switching is held in the capacitor $C_6$ by the post-holding circuit 60 from then on, and output from the post-holding circuit 60 to the outside.

The controlling section 71 generates and outputs a reset signal for controlling opening and closing operations of the switches $SW_1$ of the charge-voltage converting circuits $10_n$, a set signal for controlling opening and closing operations of the switches $SW_{21}$ of the pre-holding circuits $20_n$, shift(n) signals for controlling opening and closing operations of the switches $SW_{22}$ of the pre-holding circuits $20_n$, a phold signal for controlling opening and closing operations of the switch $SW_{51}$ of the peak holding circuit 50, an nphold signal for controlling opening and closing operations of the switch $SW_{52}$ of the peak holding circuit 50, and a hold signal for controlling opening and closing operations of the switch $SW_6$ of the post-holding circuit 60 at predetermined timings.

Figure 3:
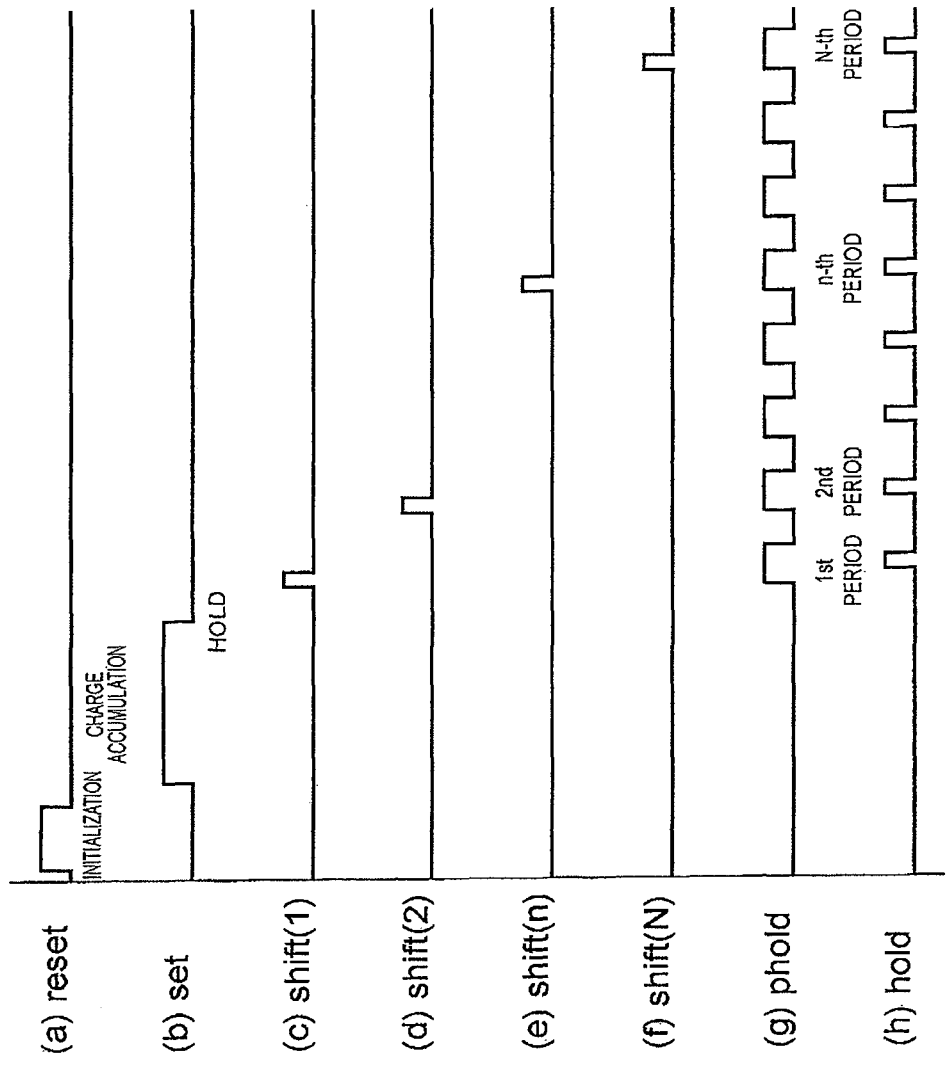
FIG. 3 is a timing chart describing operations of the solid-state imaging device 1 of the first embodiment.

FIG. 3 is a timing chart describing operations of the solid-state imaging device 1 of the first embodiment. This figure shows (a) a reset signal for controlling opening and closing operations of the switches $SW_1$ of the charge-voltage converting circuits $10_n$, (b) a set signal for controlling opening and closing operations of the switches $SW_{21}$ of the pre-holding circuits $20_n$, (c) a shift (1) signal for controlling opening and closing operations of the switch $SW_{22}$ of the 1st pre-holding circuit $20_1$, (d) a shift (2) signal for controlling opening and closing operations of the switches $SW_{22}$ of the 2nd pre-holding circuit $20_2$, (e) a shift(n) signal for controlling opening and closing operations of the switch $SW_{22}$ of the n-th pre-holding circuit $20_n$, (f) a shift(N) signal for controlling opening and closing operations of the switch $SW_{22}$ of the N-th pre-holding circuit $20_N$, (g) a phold signal for controlling opening and closing operations of the switch $SW_{51}$ of the peak holding circuit 50, and (h) a hold signal for controlling opening and closing operations of the switch $SW_6$ of the post-holding circuit 60 in order. The nphold signal for controlling opening and closing operations of the switch $SW_{52}$ of the peak holding circuit 50 is logical inversion of the phold signal for controlling opening and closing operations of the switch $SW_{51}$ of the peak holding circuit 50. The solid-state imaging device 1 operates as follows based on these control signals output from the controlling section 71.

First, the reset signal becomes high level only for a given period. During this period, in each charge-voltage converting circuit $10_n$, the switch $SW_1$ closes and the capacitor $C_1$ is discharged, and the voltage value to be output from each charge-voltage converting circuit $10_n$ is initialized. The above-described initialization operation is performed at the same timing in the N charge-voltage converting circuits $10_1$ to $10_N$.

After this initialization operation, the reset signal becomes low level, and the set signal becomes high level only for a given period. During this period, in each charge-voltage converting circuit $10_n$, the switch $SW_1$ opens and charges input into the charge-voltage converting circuit $10_n$ from the photodiode $PD_n$ are accumulated in the capacitor $C_1$, and a voltage value corresponding to the accumulated charge quantity is output from the charge-voltage converting circuit $10_n$ to the pre-holding circuits $20_n$. The above-described charge accumulation operation is performed at the same timing in the N charge-voltage converting circuits $10_1$ to $10_N$. Further, in each pre-holding circuit $20_n$, the switch $SW_{21}$ closes and the output voltage value from the charge-voltage converting circuit $10_n$ is applied to the capacitor $C_2$. In each pre-holding circuit $20_n$, when the set signal changes from high level to low level, the switch $SW_{21}$ switches from a closed state to an opened state, and the output voltage value from the charge-voltage converting circuit $10_n$ immediately before this switching is held by the capacitor $C_2$ from then on. The above-described hold operation is performed at the same timing in the N pre-holding circuits $20_1$ to $20_N$.

After the charge accumulation operation and the hold operation, a readout operation is performed. At the time of this readout operation, voltage values held by the N pre-holding circuits $20_1$ to $20_N$ respectively, are successively read out via the transimpedance amplifier 30, the peak holding circuit 50, and the post-holding circuit 60. During the period of this readout operation, the phold signal becomes high level only for a given period repeatedly N times at a constant cycle. When the phold signal is at high level, the nphold signal is at low level. Among the N periods during which the phold signal becomes high level, the period of the n-th time will be referred to as "n-th period" hereinafter.

In each n-th period, in the pre-holding circuits $20_n$, the shift(n) signal becomes high level only for a given period and the switches $SW_{22}$ close, and voltage values held by the capacitors $C_2$ are output as currents to the transimpedance amplifier 30. Voltage values converted based on a transimpedance from currents flowing in accordance with change quantities of voltage values output from the pre-holding circuits $20_n$ are output from the transimpedance amplifier 30 to the peak holding circuit 50. In the peak holding circuit 50, a peak voltage value of the voltage values output from the transimpedance amplifier 30 is held, and a voltage value corresponding to the held peak voltage value is output to the post-holding circuit 60.

Further, in each n-th period, in the post-holding circuit 60, the hold signal becomes high level only for a given period, and when the hold signal changes from high level to low level, the switch $SW_6$ switches from a closed state to an opened state, and an output voltage value from the peak holding circuit 50 immediately before this switching is held from then on and output to the outside. The output voltage value from the post-holding circuit 60 is kept until a time when the hold signal becomes high level next.

The solid-state imaging device 1 of the first embodiment which is configured and operates as described above can read out voltage values corresponding to incident light amounts on the photodiodes $PD_n$ with high accuracy as well as high speed. In other words, a photodiode $PD_n$, a charge-voltage converting circuit $10_n$, and a pre-holding circuit $20_n$ are combined as one set, and N sets of these are provided. Therefore, the charge quantities generated at the photodiodes $PD_n$ are converted into voltage values by the charge-voltage converting circuits $10_n$, so that voltage values corresponding to incident light amounts can be output with high accuracy as well as high sensitivity. The output voltage values from the charge-voltage converting circuits $10_n$ are held by the pre-holding circuits $20_n$, and for reading out the voltage values held and output by the pre-holding circuits $20_n$ as currents, the transimpedance amplifier 30 is used, so that the potentials of the wirings between the N pre-holding circuits $20_1$ to $20_N$ and the transimpedance amplifier 30 are always stable, and speed reduction caused by an increase in capacity due to the array form is suppressed, and high-speed readout is possible. A peak voltage value of the voltage signals output at a high speed from the transimpedance amplifier 30 is held by the peak holding circuit 50, so that stable readout is possible. Further, by providing the post-holding circuit 60 which holds and outputs the output voltage value from the peak holding circuit 50, a stable output voltage value is obtained from the post-holding circuit 60, and by providing an A/D converter circuit after the post-holding circuit 60, A/D conversion can be performed with high accuracy.

Second Embodiment

Figure 4:
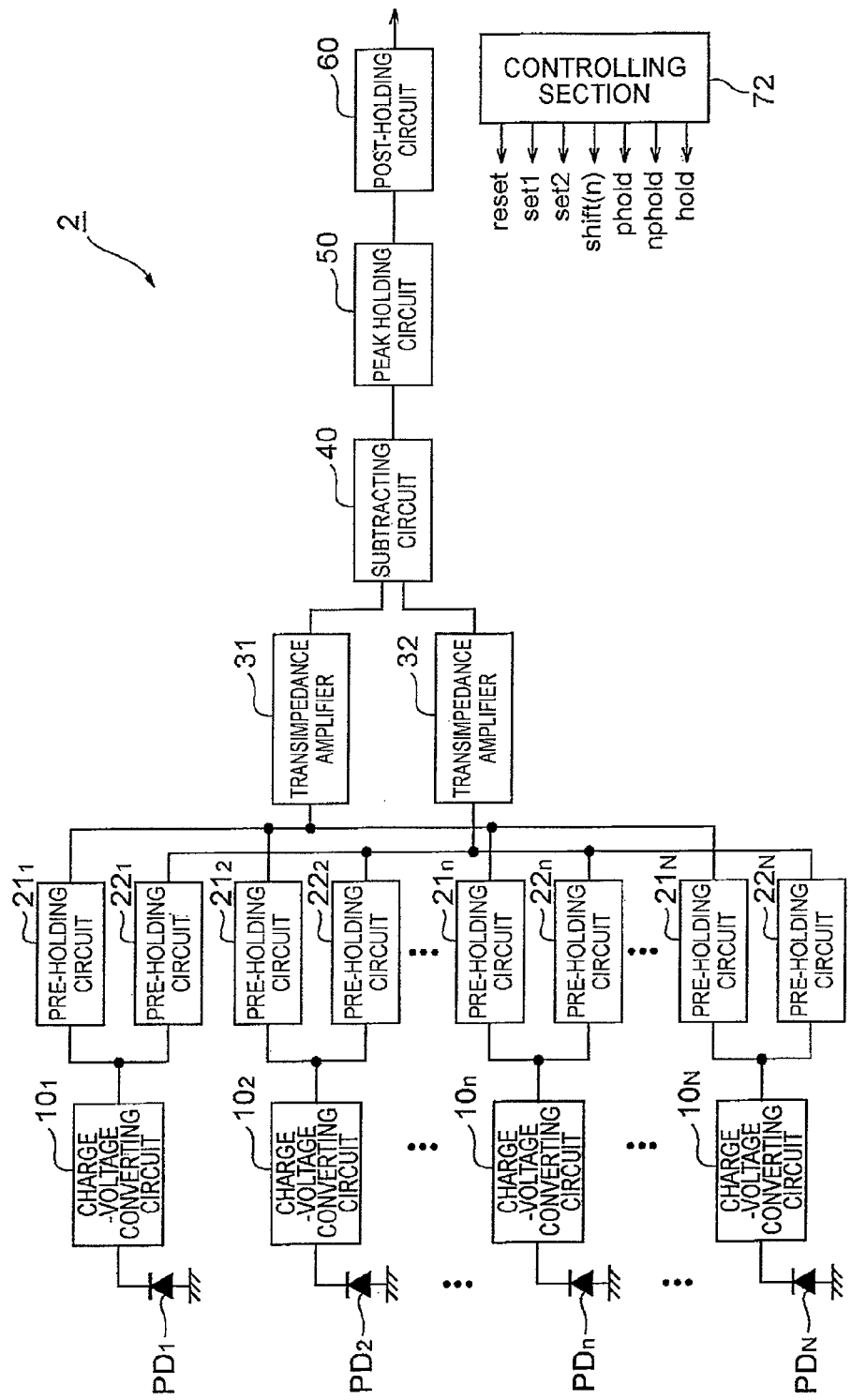
FIG. 4 is an entire configuration view of a solid-state imaging device 2 of a second embodiment.

Next, a second embodiment of a solid-state imaging device of the present invention will be described. FIG. 4 is an entire configuration view of a solid-state imaging device 2 of a second embodiment. The solid-state imaging device 2 shown in this figure includes N photodiodes $PD_1$ to $PD_N$, N charge-voltage converting circuits $10_1$ to $10_N$, N first pre-holding circuits $21_1$ to $21_N$, N second pre-holding circuits $22_1$ to $22_N$, a first transimpedance amplifier 31, a second transimpedance amplifier 32, a subtracting circuit 40, a peak holding circuit 50, a post-holding circuit 60, and a controlling section 72. Here, N is an integer not less than 2, and n appearing hereinafter is an integer not less than 1 and not more than N. The pre-hold side of each block configures an input terminal, and the post-hold side configures an output terminal.

In comparison with the configuration of the solid-state imaging device 1 of the first embodiment shown in FIG. 1, the solid-state imaging device 2 of the second embodiment shown in FIG. 4 is different in that it comprises first pre-holding circuits $21_n$ and second pre-holding circuits $22_n$ instead of the pre-holding circuits $20_n$, comprises the first transimpedance amplifier 31 and the second transimpedance amplifier 32 instead of the transimpedance amplifier 30, and further comprises a subtracting circuit 40, and comprises a controlling section 72 instead of the controlling section 71.

The N first pre-holding circuits $21_1$ to $21_N$ and N second pre-holding circuits $22_1$ to $22_N$ have a common configuration. Input terminals of each first pre-holding circuit $21_n$ and each second pre-holding circuit $22_n$ are connected to the output terminal of the charge-voltage converting circuit $10_n$. The first pre-holding circuits $21_n$, input voltage values output from the charge-voltage converting circuits $10_n$ at a first clock time into the input terminals and hold these, and output the held voltage values as currents from the output terminals to the transimpedance amplifier 31. The second pre-holding circuits $22_n$ input voltage values output from the charge-voltage converting circuits $10_n$ at a second clock time different from the first clock time into the input terminals and hold these, and output the held voltage values as currents from the output terminals to the transimpedance amplifier 32. The first pre-holding circuits $21_n$ and the second pre-holding circuits $22_n$ output voltage values held by themselves simultaneously with each other.

The transimpedance amplifier 31 and the transimpedance amplifier 32 have a common configuration. The input terminal of the transimpedance amplifier 31 is connected to the respective output terminals of the N first pre-holding circuits $21_1$ to $21_N$. The transimpedance amplifier 31 inputs the voltage values held and successively output by the N first pre-holding circuits $21_1$ to $21_N$ respectively, as currents into the input terminal, and outputs voltage values converted based on a transimpedance from the currents flowing in accordance with change quantities to the input voltage values from the reference voltage value to the subtracting circuit 40 from the output terminal. The input terminal of the transimpedance amplifier 32 is connected to the respective output terminals of the N second pre-holding circuits $22_1$ to $22_N$. The transimpedance amplifier 32 inputs voltage values held and successively output by the N second pre-holding circuits $22_1$ to $22_N$ respectively, as currents into the input terminal, and outputs voltage values converted based on a transimpedance from the currents flowing in accordance with change quantities to the input voltage values from the reference voltage value from the output terminal to the subtracting circuit 40.

The subtracting circuit 40 inputs voltage values output from the transimpedance amplifier 31 and the transimpedance amplifier 32 respectively, and outputs voltage values corresponding to the differences between these two input voltage values to the peak holding circuit 50. The input terminal of the peak holding circuit 50 is connected to the output terminal of the subtracting circuit 40. The peak holding circuit 50 inputs voltage values output from the subtracting circuit 40 into the input terminal, holds a peak voltage value of the input voltage values, and outputs a voltage value corresponding to the held peak voltage value from the output terminal to the post-holding circuit 60.

The controlling section 72 controls operations of the entirety of the solid-state imaging device 2. In particular, the controlling section 72 controls respective operations of the N charge-voltage converting circuits $10_1$ to $10_N$, the N first pre-holding circuits $21_1$ to $21_N$, the N second pre-holding circuits $22_1$ to $22_N$, the peak holding circuit 50, and the post-holding circuit 60.

This solid-state imaging device 2 operates as follows under control by the controlling section 72. In the N photodiodes $PD_1$ to $PD_N$, respectively, one-dimensionally arrayed, charge quantities corresponding to incident light amounts are generated. The charges generated at the photodiodes $PD_n$ are input into the charge-voltage converting circuits $10_n$, and voltage values corresponding to the input charge quantities are output from the charge-voltage converting circuits $10_n$ to the first pre-holding circuits $21_n$ and the second pre-holding circuits $22_n$.

The voltage values output at a first clock time from the charge-voltage converting circuits $10_n$ are held by the first pre-holding circuits $21_n$, and the held voltage values are output as currents from the first pre-holding circuits $21_n$ to the transimpedance amplifier 31. At this time, the voltage values held by the N first pre-holding circuits $21_1$ to $21_N$ respectively, are successively output as currents to the transimpedance amplifier 31.

The voltage values output at a second clock time from the charge-voltage converting circuits $10_n$ are held by the second pre-holding circuits $22_n$, and the held voltage values are output as currents from the second pre-holding circuits $22_n$ to the transimpedance amplifier 32. At this time, the voltage values held by the N second pre-holding circuits $22_1$ to $22_N$ respectively, are successively output as currents to the transimpedance amplifier 32.

The voltage value output from the charge-voltage converting circuit $10_n$ at the first clock time is a sum of a component showing a charge quantity generated at the photodiode $PD_n$ (hereinafter, referred to as "signal component"), and a component in a case where no light is made incident on the photodiode (hereinafter, referred to as "dark component"). On the other hand, the voltage value output from the charge-voltage converting circuit $10_n$ at the second clock time does not contain a signal component but includes only a dark component.

The voltage values output from the first pre-holding circuits $21_n$ are successively input as currents into the transimpedance amplifier 31, and voltage values converted based on a transimpedance from the currents flowing in accordance with change quantities to the input voltage values from the reference voltage value are output from the transimpedance amplifier 31 to the subtracting circuit 40. The voltage values output from the second pre-holding circuits $22_n$ are successively input as currents into the transimpedance amplifier 32, and voltage values converted based on a transimpedance from the currents flowing in accordance with change quantities to the input voltage values from the reference voltage value are output from the transimpedance amplifier 32 to the subtracting circuit 40. At this time, the voltage values held by the first pre-holding circuit $21_n$ and the second pre-holding circuit $22_n$, respectively, are output to the subtracting circuit 40 simultaneously with each other.

The voltage values output from the transimpedance amplifier 31 and the transimpedance amplifier 32 respectively, are input into the subtracting circuit 40, and voltage values corresponding to the differences between these two input voltage values are output from the subtracting circuit 40 to the peak holding circuit 50. The voltage values output from the subtracting circuit 40 are input into the peak holding circuit 50, and a peak voltage value of the input voltage values is held by this peak holding circuit 50, and a voltage value corresponding to the held peak voltage value is output from the peak holding circuit 50 to the post-holding circuit 60. The voltage value output from the peak holding circuit 50 is held by the post-holding circuit 60, and the held voltage value is output from the post-holding circuit 60 to the outside.

Figure 5:
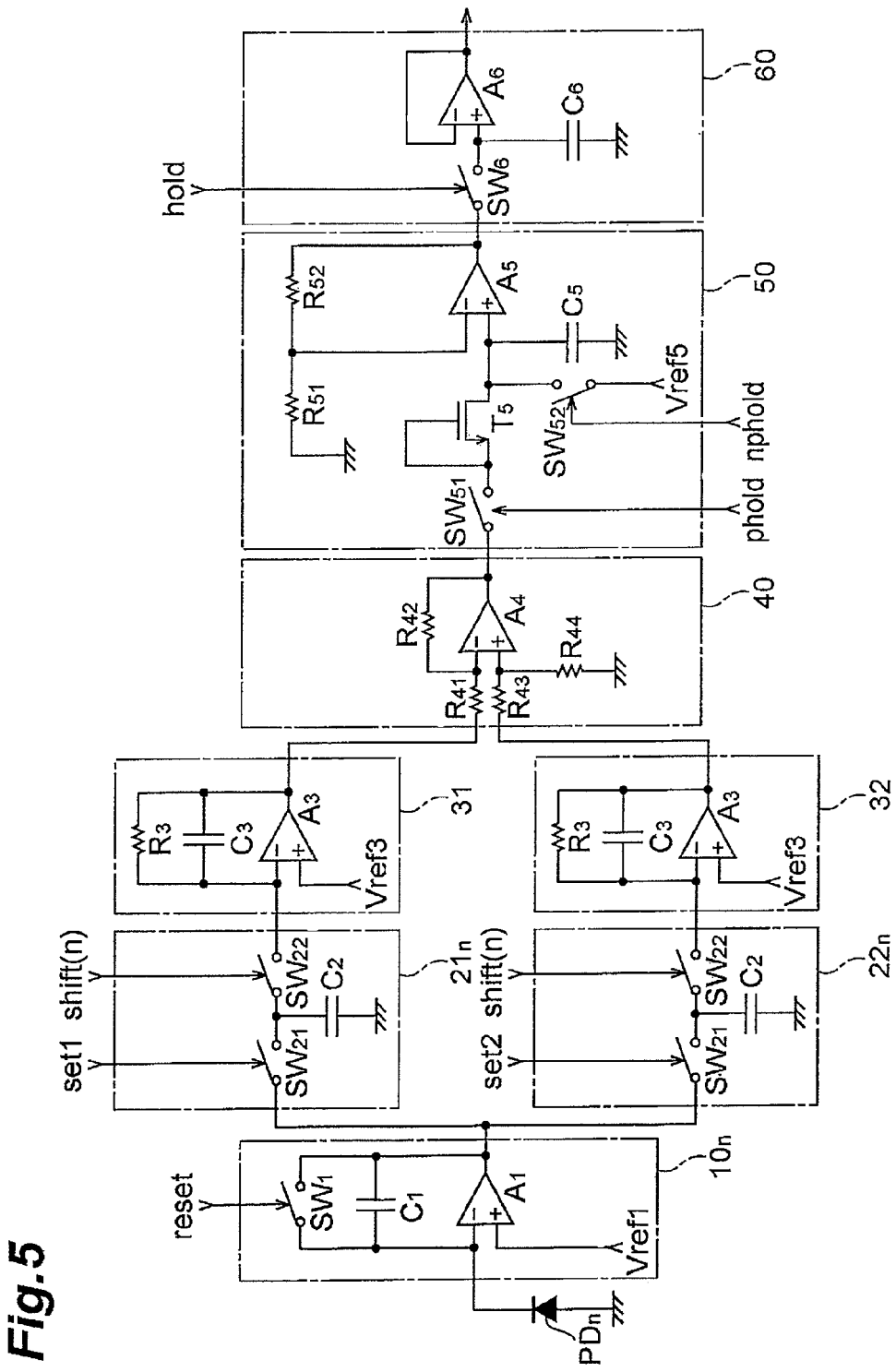
FIG. 5 is a circuit diagram of the solid-state imaging device 2 of the second embodiment.

FIG. 5 is a circuit diagram of the solid-state imaging device 2 of the second embodiment. In this figure, the n-th photodiode $PD_n$ is shown as a representative of the N photodiodes $PD_1$ to $PD_N$, the n-th charge-voltage converting circuit $10_n$ is shown as a representative of the N charge-voltage converting circuits $10_1$ to $10_N$, the n-th first pre-holding circuit $21_n$ is shown as a representative of the N first pre-holding circuits $21_1$ to $21_N$, and the n-th second pre-holding circuit $22_n$ is shown as a representative of the N second pre-holding circuits $22_1$ to $22_N$.

The charge-voltage converting circuits $10_n$, the peak holding circuit 50, and the post-holding circuit 60 of the second embodiment are the same as those shown in FIG. 2 respectively. The transimpedance amplifier 31 and the transimpedance amplifier 32 of the second embodiment are the same as the transimpedance amplifier 30 shown in FIG. 2. The first pre-holding circuits $21_n$ and the second pre-holding circuits $22_n$ of the second embodiment are the same as the pre-holding circuits $20_n$ shown in FIG. 2. However, the switches $SW_{21}$ of the first pre-holding circuits $21_n$ open and close in accordance with the level of a set1 signal, and the switches $SW_{21}$ of the second pre-holding circuits $22_n$ open and close in accordance with the level of a set2 signal.

The subtracting circuit 40 includes an amplifier $A_4$ and resistors $R_{41}$ to $R_{44}$. The inverting input terminal of the amplifier $A_4$ is connected to the output terminal of the transimpedance amplifier 31 via the resistor $R_{41}$, and also connected to the output terminal of the amplifier $A_4$ via the resistor $R_{42}$. The non-inverting input terminal of the amplifier $A_4$ is connected to the output terminal of the transimpedance amplifier 32 via the resistor $R_{43}$, and is grounded via the resistor $R_{44}$. The output terminal of the amplifier $A_4$ serves as the output terminal of the subtracting circuit 40. When the resistances of the resistor $R_{41}$ and the resistor $R_{43}$ are equal to each other and the resistances of the resistor $R_{42}$ and the resistor $R_{44}$ are equal to each other, a voltage value corresponding to the difference between voltage values output from the transimpedance amplifier 31 and the transimpedance amplifier 32 respectively, is output from the subtracting circuit 40.

The controlling section 72 generates and outputs a reset signal for controlling opening and closing operations of the switches $SW_1$ of the charge-voltage converting circuits $10_n$, a set1 signal for controlling opening and closing operations of the switches $SW_{21}$ of the first pre-holding circuits $21_n$, a set2 signal for controlling opening and closing operations of the switches $SW_{21}$ of the second pre-holding circuits $22_n$, shift(n) signals for controlling opening and closing operations of the switches $SW_{22}$ of the first pre-holding circuits $21_n$ and the second pre-holding circuits $22_n$, a phold signal for controlling opening and closing operations of the switch $SW_{51}$ of the peak holding circuit 50, an nphold signal for controlling opening and closing operations of the switch $SW_{52}$ of the peak holding circuit 50, and a hold signal for controlling opening and closing operations of the switch $SW_6$ of the post-holding circuit 60 at predetermined timings.

Figure 6:
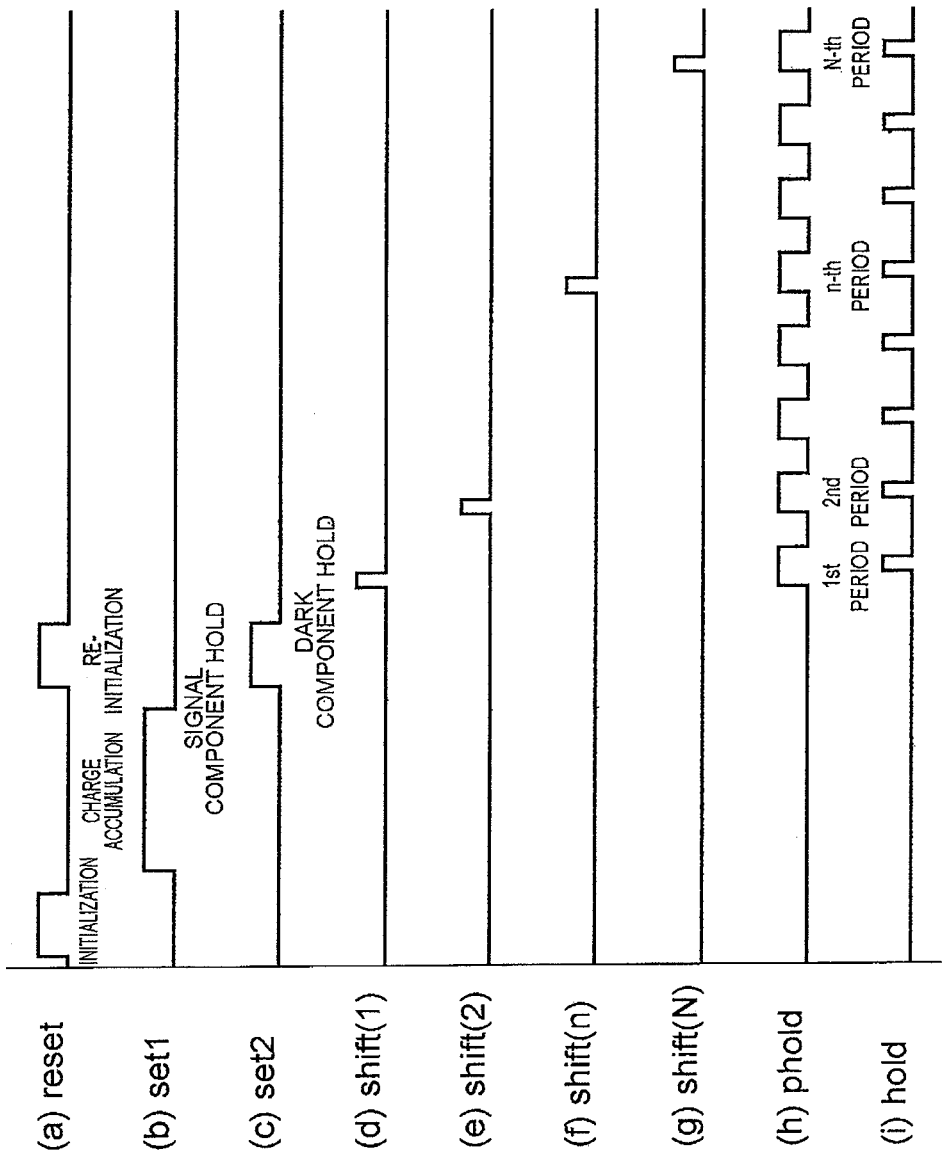
FIG. 6 is a timing chart describing operations of the solid-state imaging device 2 of the second embodiment.

FIG. 6 is a timing chart describing operations of the solid-state imaging device 2 of the second embodiment. This figure shows (a) a reset signal for controlling opening and closing operations of the switches $SW_1$ of the charge-voltage converting circuits $10_n$, (b) a set1 signal for controlling opening and closing operations of the switches $SW_{21}$ of the first pre-holding circuits $21_n$, (c) a set2 signal for controlling opening and closing operations of the switches $SW_{21}$ of the second pre-holding circuits $22_n$, (d) a shift (1) signal for controlling opening and closing operations of the respective switches $SW_{22}$ of the 1st first pre-holding circuit $21_1$ and second pre-holding circuit $22_1$ (e) a shift (2) signal for controlling opening and closing operations of the respective switches $SW_{22}$ of the 2nd first pre-holding circuit $21_2$ and second pre-holding circuit $22_2$ (f) a shift(n) signal for controlling opening and closing operations of the respective switches $SW_{22}$ of the n-th first pre-holding circuit $21_n$ and second pre-holding circuit $22_n$ (g) a shift(N) signal for controlling opening and closing operations of the respective switches $SW_{22}$ of the N-th first pre-holding circuit $21_N$ and second pre-holding circuit $22_N$ (h) a phold signal for controlling opening and closing operations of the switch $SW_{51}$ of the peak holding circuit 50, and (i) a hold signal for controlling opening and closing operations of the switch $SW_6$ of the post-holding circuit 60 in order. The nphold signal for controlling opening and closing operations of the switch $SW_{52}$ of the peak holding circuit 50 is logical inversion of the phold signal for controlling opening and closing operations of the switch $SW_{51}$ of the peak holding circuit 50. The solid-state imaging device 2 operates as follows based on these control signals output from the controlling section 72.

First, the reset signal becomes high level only for a given period. During this period, in each charge-voltage converting circuit $10_n$, the switch $SW_1$ closes and the capacitor $C_1$ is discharged, and the voltage value to be output from each charge-voltage converting circuit $10_n$ is initialized. The above-described initialization operation is performed at the same timing in the N charge-voltage converting circuits $10_1$ to $10_N$.

After this initialization operation, the reset signal becomes low level, and the sea signal becomes high level only for a given period. During this period, in each charge-voltage converting circuit $10_n$, the switch $SW_1$ opens and the charges input from the photodiode $PD_n$ into the charge-voltage converting circuit $10_n$ are accumulated in the capacitor $C_1$, and a voltage value corresponding to the accumulated charge quantity is output from the charge-voltage converting circuit $10_n$ to the first pre-holding circuit 21. The above-described charge accumulation operation is performed at the same timing in the N charge-voltage converting circuits $10_1$ to $10_N$. In each first pre-holding circuit $21_n$, when the switch $SW_{21}$ closes, the output voltage value from the charge-voltage converting circuit $10_n$ is applied to the capacitor $C_2$. In each first pre-holding circuit $21_n$, when the set1 signal changes from high level to low level, the switch $SW_{21}$ switches from a closed state to an opened state, and an output voltage value (signal component+ dark component) from the charge-voltage converting circuit $10_n$ immediately before this switching is held by the capacitor $C_2$ from then on. The above-described signal component hold operation is performed at the same timing in the N first pre-holding circuits $21_1$ to $21_N$.

After the charge accumulation operation and the signal component hold operation, the reset signal and the set2 signal respectively become high level only for a given period. During this period, in each charge-voltage converting circuit $10_n$, the switch $SW_1$ closes and the capacitor $C_1$ is discharged, and the voltage value to be output from each charge-voltage converting circuit $10_n$ is initialized again. The above-described re-initialization operation is performed at the same timing in the N charge-voltage converting circuits $10_1$ to $10_N$. In each second pre-holding circuit $22_n$, when the set2 signal changes from high level to low level, the switch $SW_{21}$ switches from a closed state to an opened state, and the initialized output voltage value (dark component) from the charge-voltage converting circuit $10_n$ immediately before this switching is held by the capacitor $C_2$ from then on. The above-described dark component hold operation is performed at the same timing in the N second pre-holding circuits $22_1$ to $22_N$.

After the re-initialization operation and the dark component hold operation, the readout operation is performed. At the time of this readout operation, voltage values held by the N first pre-holding circuits $21_1$ to $21_N$ and the N second pre-holding circuits $22_1$ to $22_N$ respectively, are successively read out via the transimpedance amplifier 31, the transimpedance amplifier 32, the subtracting circuit 40, the peak holding circuit 50, and the post-holding circuit 60. During the period of this readout operation, the phold signal becomes high level only for a given period repeatedly N times at a constant cycle. When the phold signal is at high level, the nphold signal is at low level. Among the N periods during which the phold signal becomes high level, the period of the n-th time will be referred to as "n-th period," hereinafter.

In each n-th period, in the first pre-holding circuits $21_n$, the shift(n) signal becomes high level only for a given period and the switches $SW_{22}$ close, and the voltage values held by the capacitors $C_2$ are output as currents to the transimpedance amplifier 31. In the second pre-holding circuits $22_n$, the shift (n) signal becomes high level only for a given period and the switches $SW_{22}$ close, and the voltage values held by the capacitors $C_2$ are output as currents to the transimpedance amplifier 32. The switch $SW_{22}$ of the first pre-holding circuit $21_n$ and the switch $SW_{22}$ of the second pre-holding circuit $22_n$ close at the same timing.

In each n-th period, voltage values converted based on a transimpedance from the currents flowing in accordance with change quantities of the voltage values output from the first pre-holding circuits $21_n$ are output from the transimpedance amplifier 31 to the subtracting circuit 40. Voltage values converted based on a transimpedance from the currents flowing in accordance with change quantities of voltage values output from the second pre-holding circuits $22_n$ are output from the transimpedance amplifier 32 to the subtracting circuit 40. Voltage values corresponding to the differences (corresponding to signal components from which dark components were removed) between output voltage values from the transimpedance amplifier 31 and the transimpedance amplifier 32 respectively, are output from the subtracting circuit 40 to the peak holding circuit 50. In the peak holding circuit 50, a peak voltage value of the voltage values output from the subtracting circuit 40 is held, and a voltage value corresponding to the held peak voltage value is output to the post-holding circuit 60.

Further, in each n-th period, in the post-holding circuit 60, the hold signal becomes high level only for a given period, and when the hold signal changes from high level to low level, the switch $SW_6$ switches from a closed state to an opened state, and an output voltage value from the peak holding circuit 50 immediately before this switching is held from then on and output to the outside. The output voltage value from the post-holding circuit 60 is kept until a time when the hold signal becomes high level next.

The solid-state imaging device 2 of the second embodiment which is configured and operates as described above brings about the following effect as well as the same effect as that of the solid-state imaging device 1 of the first embodiment. That is, a signal component on which a dark component is superimposed is processed by the first pre-holding circuit $21_n$ and the transimpedance amplifier 31, and the dark component is processed by the second pre-holding circuit $22_n$ and the transimpedance amplifier 32, and a difference between these is obtained by the subtracting circuit 40, and accordingly, a voltage value corresponding to the signal component from which the dark component was removed is obtained. Therefore, imaging with higher accuracy is possible.

(Modification)

Figure 7:
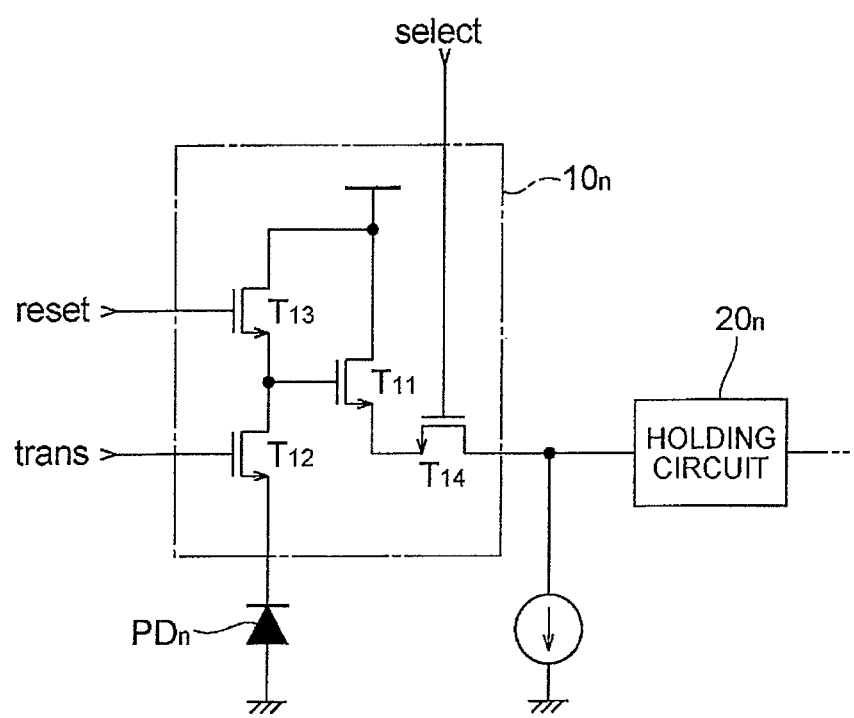
FIG. 7 is a circuit diagram of a charge-voltage converting circuit in a solid-state imaging device of a modification.

The present invention is not limited to the above-described embodiments, but can be variously modified. The above-described embodiments are of the PPS (Passive Pixel Sensor) type, however, the present invention may also be applied to the APS (Active Pixel Sensor) type. In the case of the APS type, the charge-voltage converting circuits $10_n$ have the circuit configuration as shown in FIG. 7. FIG. 7 is a circuit diagram of a charge-voltage converting circuit in a solid-state imaging device of a modification. The charge-voltage converting circuit $10_n$ of the APS type includes an amplifying transistor $T_{11}$ which outputs a voltage value corresponding to the charge quantity input in the gate terminal, a transfer transistor $T_{12}$ which transfers charges generated at the photodiode $PD_n$ to the gate terminal of the amplifying transistor $T_{11}$, a discharge transistor $T_{13}$ which discharges charges of the gate terminal of the amplifying transistor $T_{11}$, and a selecting transistor $T_{14}$ which outputs a voltage value output from the amplifying transistor $T_{11}$ to the pre-holding circuit $20_n$.

The drain terminal of the amplifying transistor $T_{11}$ is set to a bias potential. The drain terminal of the transfer transistor $T_{12}$ is connected to the gate terminal of the amplifying transistor $T_{11}$, and the source terminal is connected to the cathode terminal of the photodiode $PD_n$. The source terminal of the discharge transistor $T_{13}$ is connected to the gate terminal of the amplifying transistor $T_{11}$, and the drain terminal is set to a bias potential. The source terminal of the selecting transistor $T_{14}$ is connected to the source terminal of the amplifying transistor $T_{11}$, and the drain terminal is connected to the input terminal of the pre-holding circuit $20_n$. To the drain terminal of the selecting transistor $T_{14}$, a constant current source is connected. The amplifying transistor $T_{11}$ and the selecting transistor $T_{14}$ constitute a source follower circuit.

When a trans signal is input to the gate terminal of the transfer transistor $T_{12}$ and the trans signal is at high level, the transfer transistor $T_{12}$ transfers charges generated at the photodiode $PD_n$ to the gate terminal of the amplifying transistor $T_{11}$. When a reset signal is input into the gate terminal of the discharge transistor $T_{13}$ and the reset signal is at high level, the discharge transistor $T_{13}$ discharges the charges of the gate terminal of the amplifying transistor $T_{11}$. When a select signal is input into the gate terminal of the selecting transistor $T_{14}$ and the select signal is at high level, the selecting transistor $T_{14}$ outputs a voltage value output from the amplifying transistor $T_{11}$ to the pre-holding circuit $20_n$.

In the aforementioned embodiments, a plurality of photodiodes are one-dimensionally arrayed, however, in the present invention, the plurality of photodiodes may be two-dimensionally arrayed. In the latter case, for each column of the plurality of photodiodes two-dimensionally arrayed, a charge-voltage converting circuit and a pre-holding circuit are provided, and the operations of the aforementioned embodiments are performed for the respective rows in order.

In the present application, transimpedance amplifiers 30, 31, and 32 are described, and these operate slightly differently from general transimpedance amplifiers. In this operation, a voltage value which is held and output by the pre-holding circuit is input, and this voltage value corresponds to charges accumulated in the capacitor, and charges flow out from the capacitor to eliminate the difference between the reference voltage value applied to the non-inverting input terminal of the transimpedance amplifier and the input voltage value depending on the charges accumulated in the capacitor, and this flow as a current is converted into a voltage value by the transimpedance amplifier, so that the voltage value is input as a current and a voltage value converted based on a transimpedance from the current flowing in accordance with a change quantity to the input voltage value from the reference voltage value is output. When the voltage value of the capacity of the pre-holding circuit becomes equal to the reference voltage value, the current itself disappears, so that the output from the transimpedance amplifier also disappears, and high-speed readout becomes possible. The capacitor $C_5$ of the peak holding circuit 50 may have a drain capacity or a wiring capacity associated with the drain terminal of the FET transistor $T_5$. Similarly, the capacitor $C_6$ of the post-holding circuit 60 may have a capacity or a wiring capacity associated with the switch $SW_6$.

The invention claimed is:

1. A solid-state imaging device comprising:

photodiodes:

charge-voltage converting circuits provided after the photodiodes;

first pre-holding circuits provided after the charge-voltage converting circuits;

a first transimpedance amplifier which is provided after the first pre-holding circuits and has a capacitor between input and output terminals thereof, the first transimpedance amplifier including:

a first amplifier having:

a non-inverting input terminal receiving a reference voltage value, an inverting input terminal receiving the voltage values held and output by the first pre-holding circuits, and an output terminal, a capacitor connected between the inverting input terminal and the output terminal of the first amplifier, and a resistor connected between the inverting input terminal and the output terminal of the first amplifier; and a peak holding circuit provided after the first transimpedance amplifier, wherein the peak holding circuit inputs voltage values output from the first transimpedance amplifier, hold a peak voltage value of the input voltage values, and outputs a voltage value corresponding to the held peak voltage value, and second pre-holding circuits provided in parallel to the first pre-holding circuits after the charge-voltage converting circuits;

a second transimpedance amplifier which is provided after the second pre-holding circuits and has a capacitor between input and output terminals thereof, the second transimpedance amplifier including:

a second amplifier having:

a non-inverting input terminal receiving a reference voltage value, an inverting input terminal receiving the voltage values held and output by the second pre-holding circuits, and an output terminal, a capacitor connected between the inverting input terminal and the output terminal of the second amplifier, and a resistor connected between the inverting input terminal and the output terminal of the second amplifier; and a subtracting circuit which is interposed between the output terminal of the first transimpedance amplifier and the output terminal of the second transimpedance amplifier, and the peak holding circuit.

2. The solid-state imaging device according to claim 1, wherein the photodiodes generate charge quantities corresponding to incident light amounts;

the charge voltage converting circuits input charges generated at the photodiodes and output voltage values corresponding to the input charge quantities;

the first pre-holding circuits input and hold voltage values output from the charge-voltage converting circuits and output the held voltage values as currents;

the first transimpedance amplifier inputs voltage values held and output by the pre-holding circuits as currents, and outputs voltage values converted based on a transimpedance from the currents flowing in accordance with charge quantities to the input voltage values from a reference voltage value.

3. The solid-state imaging device according to claim 1, further comprising: a post-holding circuit which inputs and holds the voltage value output from the peak holding circuit, and outputs the held voltage value.

* * * * *

UNITED STATES PATENT AND TRADEMARK OFFICE
CERTIFICATE OF CORRECTION

PATENT NO. : 8,564,704 B2
APPLICATION NO. : 12/518383
DATED : October 22, 2013
INVENTOR(S) : Taka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 491 days.

Signed and Sealed this
Fifteenth Day of September, 2015

Michelle K. Lee
*Director of the United States Patent and Trademark Office*